July 11, 1967 C. STÖHR 3,329,998
APPARATUS FOR THE PRODUCTION OF EXTRUDED ARTICLES
WITH BRISTLES OR SPIKES
Filed April 8, 1966

INVENTOR.
CHRISTIAN STÖHR

Briskin & Goldfarb
BY:
ATTORNEYS

United States Patent Office 3,329,998
Patented July 11, 1967

3,329,998
APPARATUS FOR THE PRODUCTION OF EXTRUDED ARTICLES WITH BRISTLES OR SPIKES
Christian Stöhr, Zeyern, near Kronach, Germany, assignor to Anita Stohr, Bazenheid, Muhlaustrabe, Switzerland
Filed Apr. 8, 1966, Ser. No. 547,699
Claims priority, application Germany, July 5, 1962, St 19,443
5 Claims. (Cl. 18—12)

This application is a continuation-in-part of my copending application Ser. No. 290,722, filed June 26, 1963, and now abandoned.

This invention relates to an apparatus for the production of extruded articles with bristles or spikes, such as round or flat brushes, combs, and similar articles from plastic material. The injection molding process, commonly used for this purpose, requires expensive tools which wear down rapidly. Also, it needs a considerable amount of time because every tool must cool down in the mold under pressure. A further essential disadvantage of the prior art is that injection molding fails to produce brushes with very thin bristles.

It is, therefore, an object of the present invention to avoid these and other disadvantages and to provide new apparatus for economically producing articles with evenly spaced bristles, teeth, or spikes, e.g., brushes and combs.

According to the invention, an extruded form emerging from an extruder die with a desired profile is repeatedly cut, while still in a plastic state, transversely to the extruding direction, the depth of and spaced distance between the cuts depending on the desired size of bristles or teeth; and the extruded form is simultaneously stretched by pulling it in the extruding direction, which produces the desired evenly spaced longitudinal distance between the bristles. The pulling speed is coordinated with the cutting frequency. Controlled cooling means set the extruded form so that it is no longer in a plastic state at the time it reaches the pulling means. The cutting can be performed outside or inside the extruder head and on the outer or inner surface of the extruded form by moving rotating or swinging blades. For production of flat brushes or combs it is sufficient to reciprocate a blade in front of the extruder head.

A characteristic feature of the invention is that articles with any desired profile can be produced with ease, e.g., a strip or ribbon may be extruded having radially spaced ribs, each rib having a number of aligned spikes spaced at uniform longitudinal equal distances. Cutting these ribs down to the basic strip will produce the bristles or spikes of a flat brush. Similarly, for the production of round brushes the extruded cylindrical form may have a circumferential ribbed profile with a basic tube or rod down to the outer surface of which the ribs will be cut by a rotating or moving blade. For hollow brushes with bristles directed inwardly, the longitudinal ribs are disposed on the inner surface of a basic tube and cut by a blade rotating within the tube. Thickness and spaced distance apart of the bristles can be adjusted by changing the extrusion rate and/or the pulling speed during the extrusion process. Furthermore, the bristle length may be altered by radial adjustment of the cutting blades.

Another significant feature of the invention is the simultaneous cutting and stretching of the ribs to form the spikes or bristles. The stretching keeps the material under tension and thus prevents it from sticking to the cutting blade during the simultaneous cutting operation. The novel method has the further advantage that a rounding of the outermost edges of the spikes occurs while they are still in a plastic state but cooling, so that the bristles or spikes will lose, after the cutting, their original sharp edges due to the surface tension present. If sufficient cooling time is provided, a complete rounding of the edges can be achieved. Thus, by control of the coordinated cutting, pulling and cooling, the bristles or spikes are shaped to match the particular desired application.

Screw-shaped articles can be produced by rotation of the extruder head or die or parts thereof. The shape of the articles will depend on the direction of rotation of the die or die parts. E.g., opposite rotation of an inner and an outer die part will produce ribs with a left-hand twist and bristle rows with a right-hand twist. All requirements regarding stability and flexibility can thus be met.

The novel apparatus and method is also easily applicable to the production of brushes with air-permeable bases, e.g., round brushes for curling-pins. The basic tube extruded from the die is punched through, while being stretched, between the bristle rows by laterally moving blade tips. The punched slits immediately grow into holes because of the stretching. It is also possible by using this invention to form bristles or spikes on the outer or inner surfaces of a mesh tube extruded from oppositely rotating die parts.

From the foregoing, it will be understood that the invention facilitates the production of many different articles with bristles, spikes, teeth or similar projections, particularly of flat or round brushes, and combs. Round brushes may be designed as cylinder brushes with hollow or solid core, even with internal bristles. These brushes are useful as packing baskets for bottles and other fragile goods. Among the wide variety of other cosmetic and technical applications for products of the new process, the use of comb-like articles for gardening purposes may be mentioned.

The invention and the above-stated and other objects and features thereof will be thoroughly understood from the following detailed description with reference to the accompanying drawing, in which.

Figure 1:
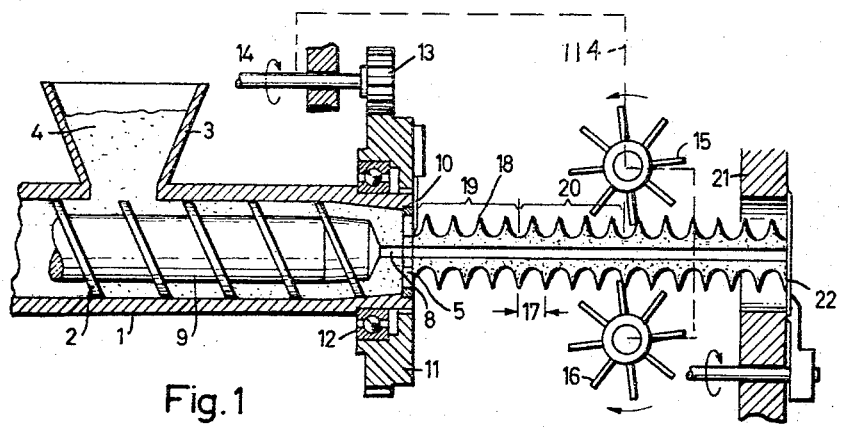
FIG. 1 is a schematic longitudinal cross sectional view of an apparatus illustrating the method for extruding and producing a round brush with external bristles according to the invention.
Figures 3, 4:
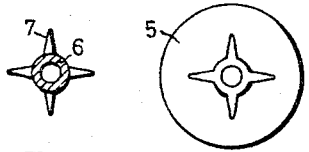
FIG. 3 is a transverse cross section through the brush of FIG. 2.
FIG. 4 is an end view of the die of FIG. 1 which shapes the ribs of the extruded form shown in FIG. 1.

FIG. 1 shows schematically a conventional extruding machine 1 for thermoplastics 4, e.g., polyethylene, which is supplied through a funnel 3 and extruded through the die 5 by the screw 2. The die is shown in detail in FIG. 4. The extruded form will consist of a basic tube 6 with radially tapering ribs 7, see FIG. 3. On the front side of the screw shaft 9, a core 8 is mounted projecting through the center of the die 5. Suitable means, not shown, for heating and driving the machine may be provided in a conventional manner.

For performing the new production process, a rotating blade 10 is provided to cut the ribs 7 helicoidally due to the simultaneous stretching. The blade 10 is secured to a gear wheel 11 adapted to rotate on a ball bearing 12 mounted on the extrusion head. The spur gear 11 is driven by another gear wheel 13 mounted on the shaft 14 of a suitable motor, not shown.

Figure 2:
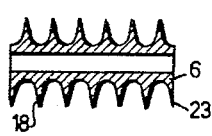
FIG. 2 is a longitudinal cross section of a completed round brush with spaced spikes produced by the apparatus of FIG. 1.

The rotating blade 10 cuts the ribs 7 down to the outer surface of the basic tube 6. At the same time, a pulling and stretching is caused by the pulling wheels 15 and 16 provided with spokes which engage the now cooled and hardened bristles 18 as the latter reach the pulling wheels. The pulling action stretches the still plastic tube 6 while the ribs 7 are being cut by the blade 10. The spoked wheels 15, 16 are rotationally co-ordinated with the movements of blade 10 by being operatively connected to shaft 14, such as by gears or other transmission means, as schematically illustrated by the dotted line 114, shown in FIG. 1. Thus, the individual bristles or spikes 18 will have respective uniform longitudinal distances 17. The stretching is performed within the zone 19. Afterwards, the material passes a controlled cooling zone 20 where it is sufficiently cooled by air or water so that the spikes or bristles can be gripped without deformation by the spokes of wheels 15, 16. Finally, the extruded form is fed through a guide jack 21. A blade 22 rotating on said jack will cut off brushes of desired length. A finished brush 23 is shown in longitudinal section in FIG. 2, in transverse cross-section in FIG. 3.

Instead of forming a basic tube as at 6, a solid rod may be extruded. Furthermore, the ribs or fins 7 may have various shaped profiles.

Figure 5:
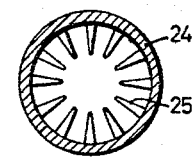
FIG. 5 is a transverse cross section through a hollow brush produced according to the apparatus and method illustrated in FIG. 6.
Figure 6:
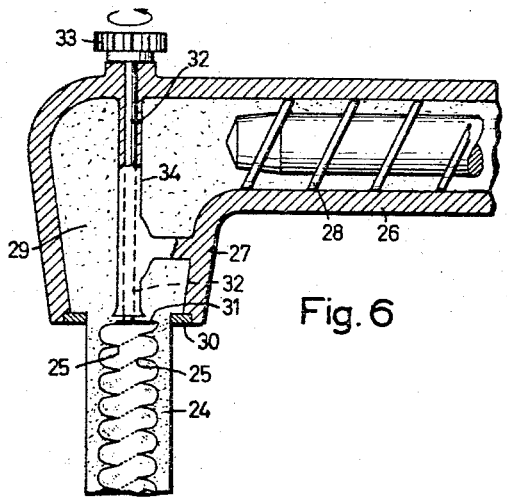
FIG. 6 is a longitudinal cross sectional view of an apparatus and illustrating the method for extruding a brush with radially extending internal bristles according to the invention.

Referring now to FIGS. 5 and 6, the production of a hollow brush will be exemplified. As shown in FIG. 5, the hollow brush comprises a basic tube 24 with bristles 25 extending radially inward. Such a brush can be made by an extruding machine 26 with an angle head 27, as shown in FIG. 6.

The screw 28 forces and extrudes the thermoplastics 29 through the die 30. Within the die, a blade 31 is secured to a shaft 32 with a gear wheel 33 for external drive, not shown. The shaft 32 is rotatably mounted in a sleeve 34 which simultaneously serves as core within the die 30. The extruded form consists of a tube 24 with inner ribs 25, which are cut by the rotating blade 31 transverse to the extruding direction. Pulling means similar to these shown in FIG. 1 exert a stretching force on the material and thus form spaced inwardly extending bristles 25.

The distance of the bristles 18 (FIG. 1) and 25 (FIG. 6) may be altered during operation by controlling the pulling speed of spoked wheels 15, 16. The bristle thickness may also be changed by altering the extruding speed. The bristle length may be influenced at will by adjusting the cutter blades 10 and 31, respectively.

Figure 7:
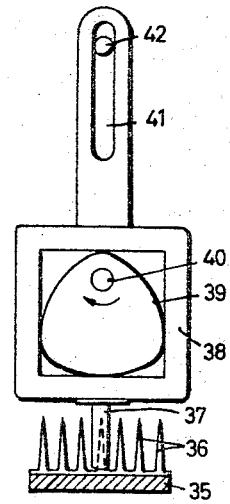
FIG. 7 is a cross section through a flat brush and details of a cutting a forming tool for producing spaced apart spikes.

FIG. 7 shows a flat brush in section. To produce such a brush, an extruding machine according to FIG. 1 is provided with a suitable slot die. The extruded form consists of a basic strip or ribbon 35 bearing a number of longitudinally extending tapering ribs 36. In front of the die, instead of the rotating blade 10 there is arranged a reciprocating or swinging blade 37 to cut the ribs in desired distances down to the basic strip 35 under stretching. The blade or tool 37 is secured to a guide frame 38 actuated by a cam disc 39 mounted on a rotatable shaft 40 arranged for being driven by an external drive. The frame is pivotedly swung about a guide pin 42 projecting into a slotted hole 41 during operation.

While several specific applications of the new method have been shown and explained in detail, it will be apparent to anyone skilled in the art that numerous modifications are possible without departing from the spirit and scope of the invention as set forth in the claims annexed hereto.

I claim:
1. Apparatus for the production from thermoplastics of brushes, combs and similar articles having bristles or spikes, in combination with an extrusion machine, a die insertable in said extrusion machine for continuously extruding in a plastic state a ribbed profile form having a plurality of tapering ribs extending longitudinally along the extruded form, a movable cutting blade mounted adjacent said die for cutting through and across said ribs in sequential cuts of said blade so as to cut said ribs into protrusions at predetermined spaced locations along the extruded form, pulling wheel means spaced from and cooperating in timed relation with said cutting blade, said pulling wheel means being engageable with said extruded profile form to longitudinally stretch said extruded profile form so as to form said protrusions into spaced spikes while stretching said spaced locations therebetween into uniform spaces of given length, and controlled cooling means located between said die and said pulling wheel means for cooling and setting the extruded form.

2. A device according to claim 1, said movable blade having a rotatable shaft for driving the blade in a rotary motion, and transmission means operatively connecting said shaft with said pulling wheels.

3. A device according to claim 2, said pulling wheels being provided with spokes engageable with said protrusions.

4. A device according to claim 1, said cutting blade having a shaft mounted coaxially with the extrusion die and extending backwardly therefrom into the extrusion press, said die being shaped to extrude a basic tube with said tapering ribs extending therefrom radially inwardly, said cutting blade being mounted on said shaft and positioned within said die for cutting through and across said inwardly protruding ribs.

5. A device according to claim 1, said movable blade having means for imparting reciprocating motion to the blade to move it transverse to the extruding direction.

References Cited

UNITED STATES PATENTS

| 1,438,231 | 12/1922 | Goodenberger | 264—164 |
| 2,597,975 | 5/1952 | Colombo | 264—290 |
| 2,917,779 | 12/1959 | Kurzke et al. | 264—290 |
| 3,069,726 | 12/1962 | Adams | 264—290 |
| 3,249,668 | 5/1966 | Seragg et al. | |

FOREIGN PATENTS 621,676  6/1961  Italy.

ROBERT F. WHITE, *Primary Examiner.*

S. HELLER, S. I. LANDSMAN, *Assistant Examiners.*